(12) United States Patent
Takahashi et al.

(10) Patent No.: US 8,650,977 B2
(45) Date of Patent: Feb. 18, 2014

(54) ELECTRIC ACTUATOR

(75) Inventors: Toru Takahashi, Iwata (JP); Yoshinori Ikeda, Iwata (JP); Tatsunori Shimizu, Iwata (JP)

(73) Assignee: NTN Corporation, Osaka-shi (JP)

( * ) Notice: Subject to any disclaimer, the term of this patent is extended or adjusted under 35 U.S.C. 154(b) by 27 days.

(21) Appl. No.: 13/478,475

(22) Filed: May 23, 2012

(65) Prior Publication Data
US 2012/0227524 A1 Sep. 13, 2012

Related U.S. Application Data

(63) Continuation of application No. PCT/JP2010/071103, filed on Nov. 26, 2010.

(30) Foreign Application Priority Data

Nov. 26, 2009 (JP) ................................. 2009-268344

(51) Int. Cl.
*F16H 25/20* (2006.01)
(52) U.S. Cl.
USPC ..................................... 74/89.34; 324/207.25
(58) Field of Classification Search
USPC ................ 74/89.23, 89.31, 89.34; 324/207.2, 324/207.21, 207.25
See application file for complete search history.

(56) References Cited

U.S. PATENT DOCUMENTS

| 4,673,876 | A  | * | 6/1987 | Paulsen ..................... 324/207.21 |
| 6,585,246 | B2 | * | 7/2003 | McCormick et al. ......... 269/239 |
| 7,520,192 | B2 | * | 4/2009 | Mock ........................... 74/89.34 |

FOREIGN PATENT DOCUMENTS

| JP | 2003-120670 | | 4/2003 |
| JP | 2004-76620 | * | 3/2004 |
| JP | 2007-232023 | | 9/2007 |
| JP | 2008-274971 | | 11/2008 |

* cited by examiner

*Primary Examiner* — William C Joyce
(74) *Attorney, Agent, or Firm* — Harness, Dickey & Pierce, P.L.C.

(57) ABSTRACT

An electric actuator has a housing (2), an electric motor (3), a speed reduction mechanism (6), a ball screw mechanism (8) and a rotation sensor (9). The ball screw mechanism (8) has a screw thread shaft (23) that moves axially but cannot rotate relative to the housing (8). A nut (24) is inserted over the screw thread shaft (23) and can rotate relative to the housing (2), via a rolling bearing (11), mounted on the housing (2), but cannot move axially. A swing link (13) is arranged to perform the pendulum motion interlocked with the linear motion of the driving shaft (7). A magnet (18) is mounted on the end of a pivotal shaft (17) to form the reference point of the pendulum motion. The position of the driving shaft (7) is detected by the rotation sensor (9) arranged opposite to the magnet (18) via a predetermined air gap.

10 Claims, 5 Drawing Sheets

ELECTRIC ACTUATOR

CROSS-REFERENCE TO RELATED APPLICATIONS

This application is a continuation of International Application No. PCT/JP2010/071103, filed Nov. 26, 2010, which claims priority to Japanese Application No. 2009-268344, filed Nov. 26, 2009. The disclosures of the above applications are incorporated herein by reference.

FIELD

The present disclosure relates to an electric actuator with a ball screw mechanism used in motors in general industries, driving sections of automobiles, boats etc., and, more particularly, to an electric actuator, with a position detecting function, used to convert rotary motion from an electric motor to linear motion of a drive shaft via a ball screw mechanism.

BACKGROUND

In general, gear mechanisms, such as a trapezoidal thread worm gear mechanism or a rack and pinion gear mechanism, have been used as the mechanism to convert rotary motion of an electric motor to an axial linear motion in an electric actuator. These motion converting mechanisms utilize sliding contact portions and thus power loss. Accordingly, they are obliged to increase the size of the electric motors and power consumption. Accordingly, the ball screw mechanisms have been widely adopted as more efficient actuators.

For example in a relatively small boat having a screw driven by an internal combustion engine, the direction change operation of screw rotation between forward and backward directions is carried out by switching a dog clutch, via a wire connected to a lever operated by an operator, to select a forward or a rearward gear. However, an electric actuator for switching the dog clutch has been developed in recent years for labor saving.

In this case, the electric actuator is required to accurately detect the position of the dog clutch in switching the forward and backward directions of the boat and to perform the switching operation. For example, the rotation angle is transmitted to a potentiometer, via a sensor gear, in accordance with the stroke of the moving shaft to obtain the stroke of the moving shaft by detecting its absolute position. However, this requires an increase in the gear ratio of the sensor gear when the stroke of the moving shaft is increased. Thus, this increases the gear size or the gear stage of the sensor gear and brings an increase in the size of the electric actuator. In addition, it is believed that the accuracy of the rotation angle detected by the potentiometer would be detracted due to backlash or pitch error of the sensor gear. Furthermore, it is believed that high detection accuracy would not be obtained due to the generation of a shift of the zero point when the potentiometer is used in a place such as the inside of the electric actuator having a high environmental temperature, due to heat generation of a motor. On the other hand, it is possible to use the potentiometer under a circumstance of ordinary temperature when the potentiometer is mounted on the outside of a housing of the electric actuator. However, in such a case, since the potentiometer is contaminated by sea water, fuel etc., it is necessary to have a water-tight or oil-tight structure or to have a separate structure to provide electromagnetic shielding, which would increase the manufacturing cost of the electric actuator.

An electric actuator 100 is known that can solve these problems, as shown in FIG. 5. The electric actuator 100 includes a housing 101 and an electric motor 102 mounted within the housing 101.

The housing 101 includes a housing body 101A, a cover member 101B mounted on an end face of the housing body 101A and a plate-like motor bracket 101C. A motor chamber 101a and a screw thread shaft chamber 101b are formed within the housing body 101A. The electric motor 102 is arranged within the motor chamber 101a. The electric motor 102 is secured on the motor bracket 101C. The motor bracket 101C is mounted to sandwich an outer race of a ball bearing 114 against the housing body 101A. The motor bracket 101C blocks both the motor chamber 101a and the screw thread shaft chamber 101b of the housing body 101A.

The electric motor shaft 102a projects from the motor bracket 101C. A first gear 103 is securely press fit onto the end of the shaft 102a incapable of rotation relative to the shaft 102a. A second gear 105, of resin material, is freely rotationally mounted on a long shaft 104 secured to the motor bracket 101C. The second gear 105 meshes with the first gear 103 and a third gear 106. The third gear 106, of resin material, is mounted on the end of the screw thread shaft 107 and is incapable of relative rotation to the shaft 107, via a serration connection. The left-side portion of the screw thread shaft 107 is formed with a male thread groove 107a. The right-side portion is rotationally supported by a ball bearing 114 relative to the housing body 101A.

The screw thread shaft 107 is passed through a cylindrical nut 115. The inner circumference of the nut 115 is formed with a female thread groove 115a opposing the male thread groove 107a. A large number of balls 116 are rollably contained in a helical passage formed by the male and female thread grooves 107a, 115a to form the ball screw mechanism. The nut 115 is held within the screw thread shaft chamber 101b so that it can axially move but cannot rotate relative to the housing body 101A. The ball screw mechanism and a cylindrical moving shaft 117 form a driving mechanism.

The left-side end of the screw thread shaft 107 is inserted into a blind bore 117a formed in the moving shaft 117. The right-side end of the moving shaft 117 is coaxially fit into the nut and secured to it by pins to integrally move with it. The moving shaft 117 is axially movably supported by a bush 118 axially movable relative to the housing body 101A. An aperture 117b, for connecting to a link member (not shown), is formed in an end of the moving shaft 117 projecting from the housing body 101A.

FIG. 6 is a schematic view of the inside structure of the electric motor 102. FIG. 7 is a cross-section view taken along a line VII-VII. As shown in these drawings, an annular magnet MG is secured on a shaft 102a on which a rotor 102d is mounted. The annular magnet MG is separated to half annular portions MGs, MGn arranged at both sides of the rotation shaft 102a. The half annular portion MGs has the S pole on its outer circumference and the half annular portion MGn has the N pole on its outer circumference. First and second sensors SA, SB are mounted on the inner wall of a motor housing 102c shifted 90° to each other around the axis of the shaft 102a.

The stroke of the moving shaft 117 is determined by the amount of rotation of the rotation shaft 102a of the electric motor 102, the gear ratio of the gears 103, 105, 106 and the lead of the ball screw mechanism. Since the gear ratios and the lead are known values, it is possible to detect the position of a dog clutch (not shown) if the amount of rotation can be exactly measured. Thus, it can be found that the annular magnet MG is rotated in a clockwise direction (CW) when the wave phase of the sensor SB is advanced from that of the sensor SA. On the contrary, it can be found that the annular magnet MG is rotated in the counterclockwise direction (CCW) when the wave phase of the sensor SB is delayed from that of the sensor SA. Accordingly, it is possible that the control apparatus ECU can accurately obtain the stroke and the moving direction of the moving shaft 117 by the output signals of the sensors SA, SB. See, Japanese Laid-open Patent Publication No. 2008-274971.

In the prior art electric actuator 100, the sensors SA, SB output pulse signals, in accordance with the rotation of the electric motor 102, and are arranged within the housing 102c of the electric motor 102. Also, the control apparatus ECU is provided to determine the stroke and the direction of the moving shaft 117 by the outputs from the sensors SA, SB. Thus, it is possible to protect the sensors SA, SB from the external environment and to improve the reliability of the electric actuator as a system.

However, the structure and technology for arranging the sensors SA, SB within the housing 102c of the electric motor 102 requires special knowledge and designing manner. Thus, it is necessary to use an electric motor with a special design. Thus, the versatility of the electric motor is detracted. In addition, this increases the manufacturing cost of the actuator since it is impossible to use a versatile electric motor in various applications requiring different performances.

SUMMARY

Therefore, it is an object of the present disclosure to provide an electric actuator provided with a position detecting mechanism that can protect the rotation sensors from the external environment and can be manufactured at a low cost.

To achieve the object, an electric actuator comprises a housing with an electric motor mounted on the housing. A speed reduction mechanism transmits the rotational power of the electric motor to a ball screw mechanism. The ball screw mechanism is adapted to convert the rotational motion of the electric motor, transmitted via the speed reduction mechanism, to an axial linear motion of a driving shaft. A rotation sensor detects the position of the driving shaft. The ball screw mechanism includes a screw thread shaft integrally formed with the driving shaft connected to the electric motor. The screw thread shaft is supported on the housing so that it can be moved axially but cannot be rotated relative to the housing. A nut is inserted over the screw thread shaft via a large number of balls. The nut is supported so that it can rotate relative to the housing, via a rolling bearing mounted on the housing, but cannot move axially. A swing link, pivoted on a pin projecting from the driving shaft, is arranged so that it performs the pendulum motion interlocked with the linear motion of the driving shaft. A magnet is mounted on the end of a pivotal shaft forming the reference point of the pendulum motion. The position of the driving shaft is detected by the rotation sensor arranged opposite to the magnet via a predetermined air gap.

A speed reduction mechanism transmits the rotational power of the electric motor to a ball screw mechanism. The ball screw mechanism is adapted to convert the rotational motion of the electric motor, transmitted via the speed reduction mechanism, to an axial linear motion of a driving shaft. A rotation sensor detects the position of the driving shaft. The ball screw mechanism includes a screw thread shaft integrally formed with the driving shaft, connected to the electric motor. The screw thread shaft is supported on the housing so that it can move axially but cannot rotate relative to the housing. A nut is inserted over the screw thread shaft via a large number of balls. The nut is supported so that it cannot rotate relative to the housing, via a rolling bearing mounted on the housing, but it can move axially. A swing link, pivoted on a pin projecting from the driving shaft, is arranged so that it performs the pendulum motion interlocked with the linear motion of the driving shaft. A magnet is mounted on the end of a pivotal shaft forming the reference point of the pendulum motion. The position of the driving shaft is detected by the rotation sensor arranged opposite to the magnet, via a predetermined air gap. Thus, it is possible to provide an electric actuator of wide versatility provided with a position detecting mechanism that can protect the rotation sensors from the external environment and can be manufactured at a low cost.

A nonmagnetic material sensor case is mounted on the housing. The rotation sensor is arranged on the sensor case. The detection angle (swing angle) of the swing link is measured via the sensor case. This makes it possible to protect the rotation sensor and its associated parts from the internal environment without influences such as a splash of lubricating grease or penetration of any contamination.

A through aperture is formed in the sensor case at a portion opposing the magnet. The sensor case is blocked by a plate-like wall of non-magnetic material. The detection angle of the swing link is measured by the rotation sensor, via the plate-like wall. This makes it possible to easily perform the air gap adjustment between the rotation sensor and the magnet.

An opening is formed in the housing. The sensor case is mounted on the housing so that it blocks the opening. This makes the mount of the swing link easy and the assembling operation simple.

One end of the pivotal shaft is supported by a bearing mounted on the housing. The other end of the pivotal shaft is contained and supported in a cylindrical bore formed on the inner side of the sensor case. This makes it possible to stably support the pivotal shaft by both the bore and the bearing at both its ends. Also, it prevents attraction of iron powder in contaminations to the magnet by the bore. Thus, this improves the reliability of the actuator.

A recess is formed in the sensor case. The rotation sensor is arranged in the recess and embedded by a resin molding. This makes it possible to shield the rotation sensor and its associated parts from the external environment and thus protect them.

The rotation sensor is formed by a semiconductor sensor with an integrated magnetic sensor and a signal processing circuit. A function for detecting the absolute angle is also incorporated. This makes it possible to keep stable detecting accuracy for a long term and to improve the reliability, even though vibration or shocks, during severe running condition of a vehicle.

The voltage output from the rotation sensor is obtained as both an analog signal and a digital signal. This makes it possible to arbitrarily select either the digital signal or the analog signal in accordance with the system. Thus, this increases the freedom of design of the system.

The sensor case is formed by injection molding of a thermoplastic resin. This enables a complicated configuration of the sensor case to be formed at a low manufacturing cost that does not provide any influence to the sensitivity of the rotation sensor.

The swing link includes a first link member pivoted on the pin on the driving shaft. A second link member is connected to the first link member via a pivot pin. In this structure, the swing link can prevent the driving shaft from being rotated. Thus, the swing motion is performed without interfering in the axial motion of the driving shaft. Thus, this makes it possible to provide a further compact electric actuator.

The electric actuator comprises a housing, an electric motor, a speed reduction mechanism and a ball screw mechanism. The electric motor is mounted on the housing. The speed reduction mechanism transmits the rotational power of the electric motor to a ball screw mechanism. The ball screw mechanism converts the rotational motion of the electric motor, transmitted via the speed reduction mechanism, to an axial linear motion of a driving shaft. A rotation sensor detects the position of the driving shaft. The ball screw mechanism includes a screw thread shaft integrally formed with the driving shaft connected to the electric motor. The screw thread shaft is supported on the housing so that it moves axially but cannot rotate relative to the housing. A nut is inserted over the screw thread shaft via a large number of balls. The nut is supported so that it can rotate relative to the housing, via a rolling bearing mounted on the housing, but cannot move axially. A swing link, pivoted on a pin projecting from the driving shaft, is arranged to perform the pendulum motion interlocked with the linear motion of the driving shaft. A magnet is mounted on the end of a pivotal shaft that forms the reference point of the pendulum motion. The position of the driving shaft is detected by the rotation sensor arranged opposite to the magnet, via a predetermined air gap. Thus, it is possible to provide an electric actuator with a position detecting mechanism that can protect the rotation sensors from the external environment and can be manufactured at a low cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One mode for carrying out the present disclosure is an electric actuator comprising a housing, an electric motor, a speed reduction mechanism and a ball screw. The electric motor is mounted on the housing. The speed reduction mechanism transmits the rotational power of the electric motor to the ball screw mechanism. The ball screw mechanism converts the rotational motion of the electric motor, transmitted via the speed reduction mechanism, to an axial linear motion of a driving shaft. A rotation sensor detects the position of the driving shaft. The ball screw mechanism includes a screw thread shaft integrally formed with the driving shaft connected to the electric motor. The screw thread shaft is supported on the housing so that it moves axially but cannot rotate relative to the housing. A nut is inserted over the screw thread shaft via a large number of balls. The nut is supported so that it can rotate relative to the housing, via a rolling bearing mounted on the housing, but cannot move axially. An opening is formed in the housing. The sensor case is mounted on the housing so that it blocks the opening. The rotation sensor is arranged in the recess and embedded by resin molding. A swing link, pivoted on a pin projecting from the driving shaft, is arranged to perform the pendulum motion interlocked with the linear motion of the driving shaft. A magnet is mounted on the end of a pivotal shaft to form the reference point of the pendulum motion. The position of the driving shaft is detected by the rotation sensor arranged opposite to the magnet, via a predetermined air gap.

A preferable embodiment of the present disclosure will be hereinafter described with reference to the drawings.

Figure 1:
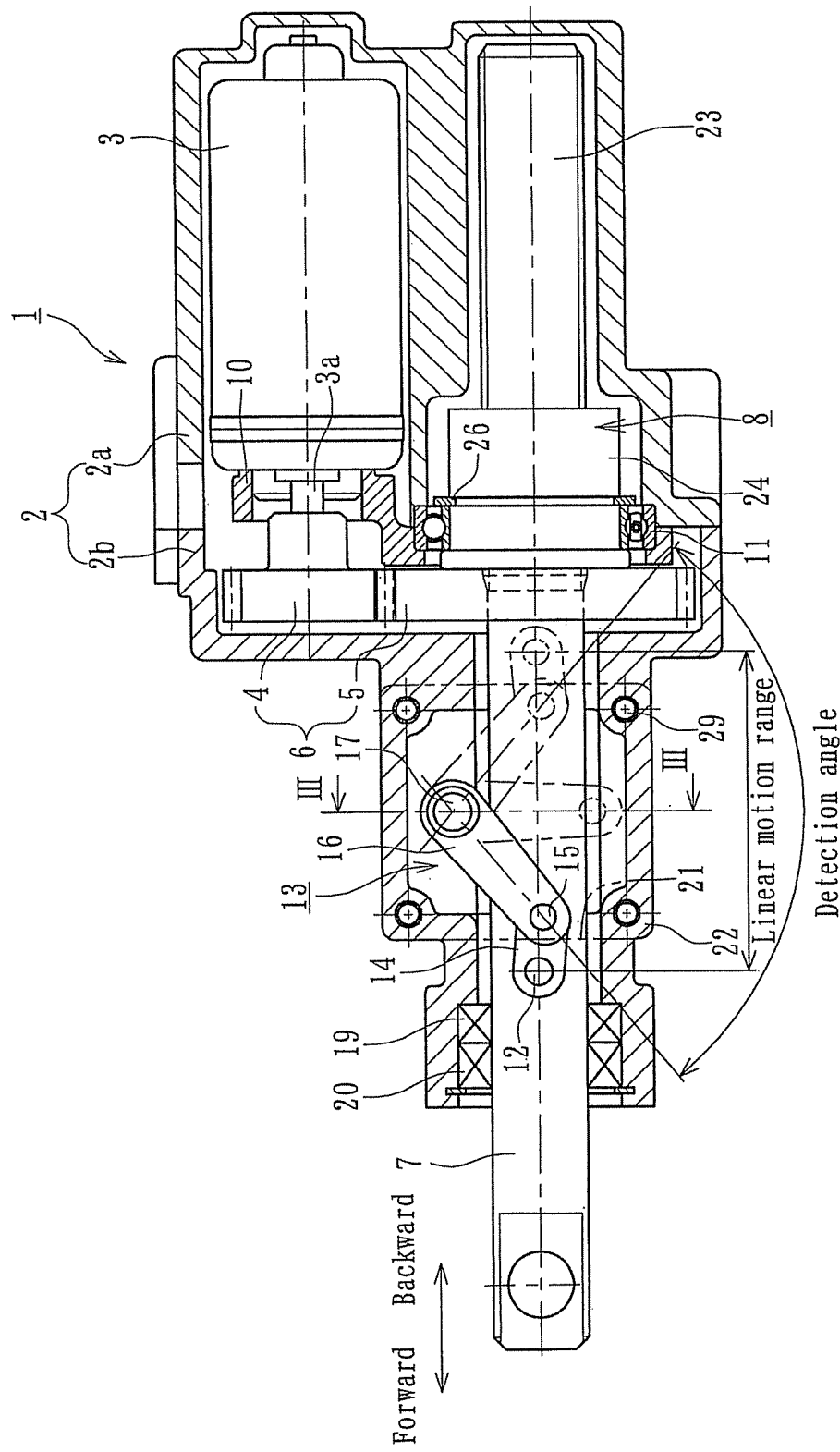
FIG. 1 is a longitudinal section view of a first embodiment of an electric actuator.
Figure 2:
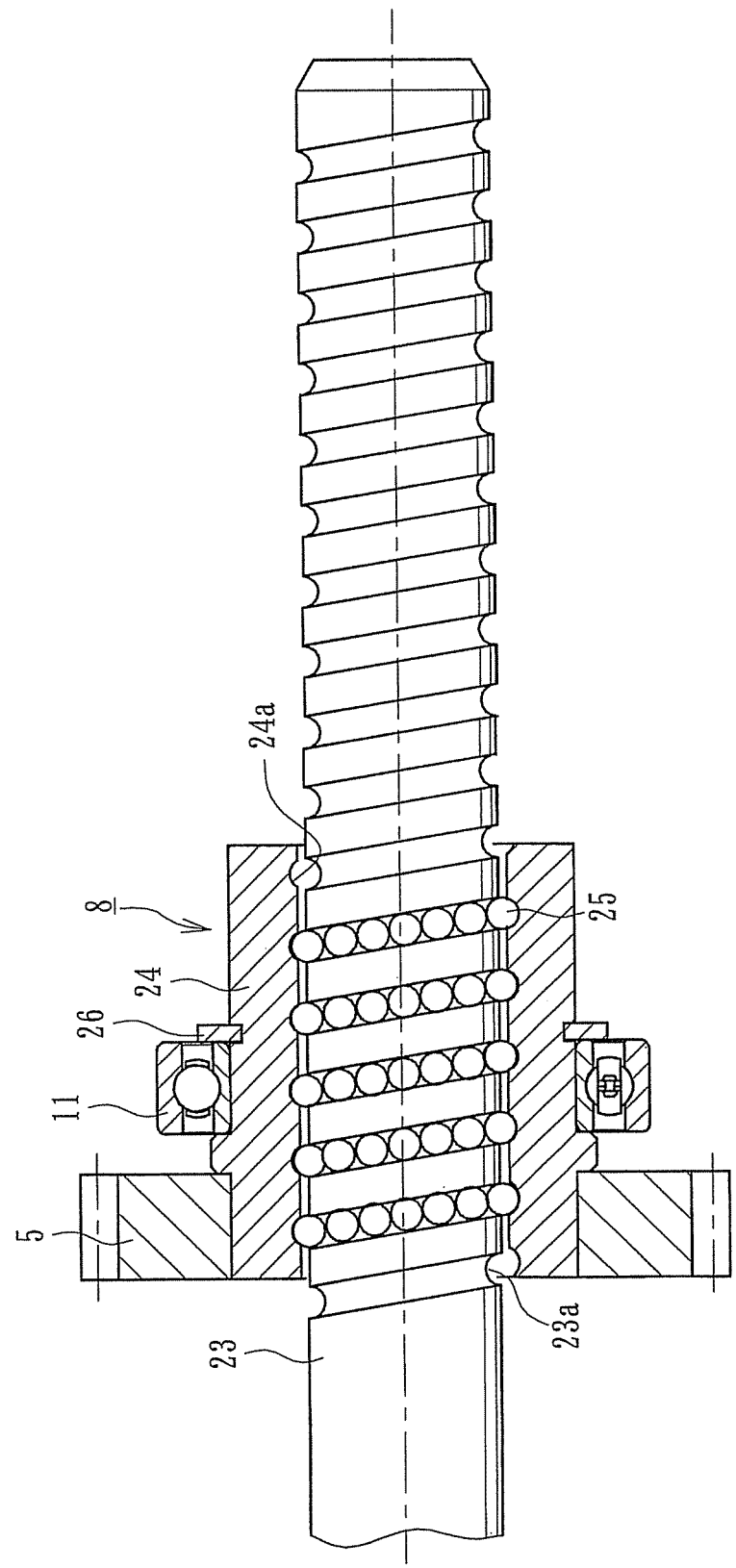
FIG. 2 is a longitudinal section view of a ball screw mechanism of the electric actuator of FIG. 1.
Figure 3:
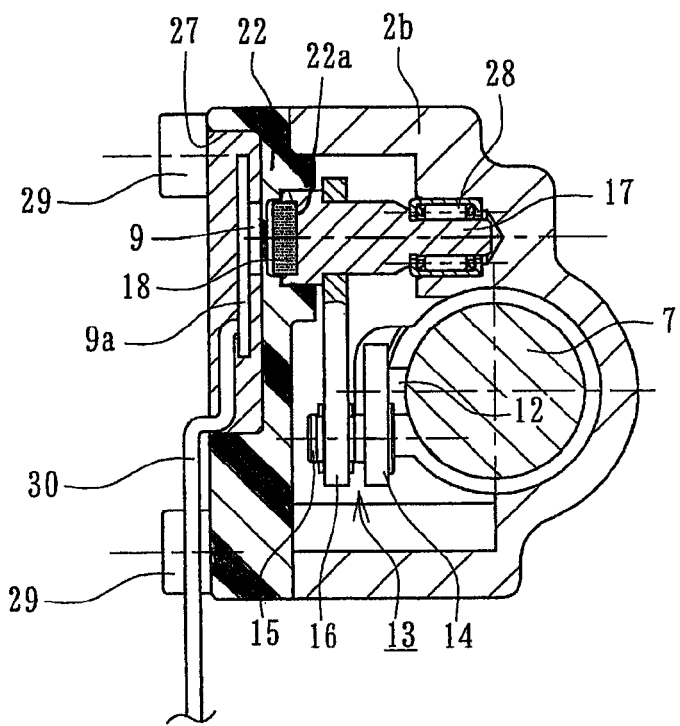
FIG. 3 is a cross-section view taken along line of FIG. 1.
Figure 4:
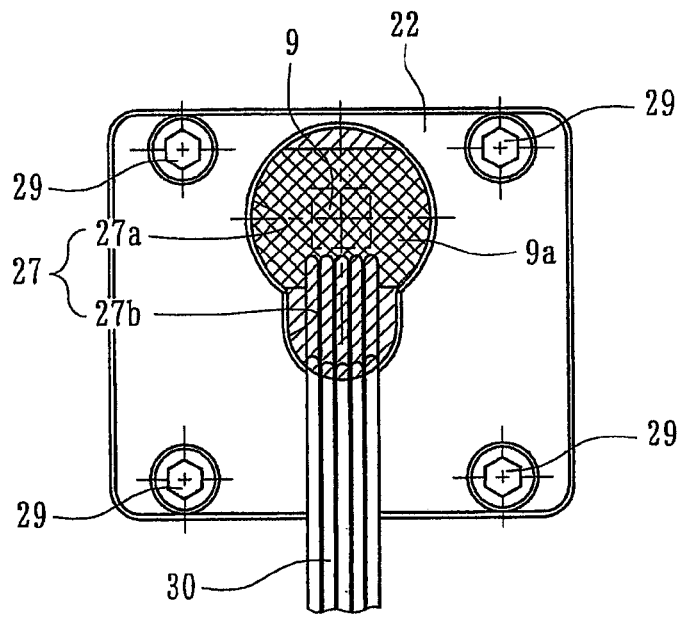
FIG. 4 is a front elevation view of a sensor case of the electric actuator of FIG. 1.
Figure 5:
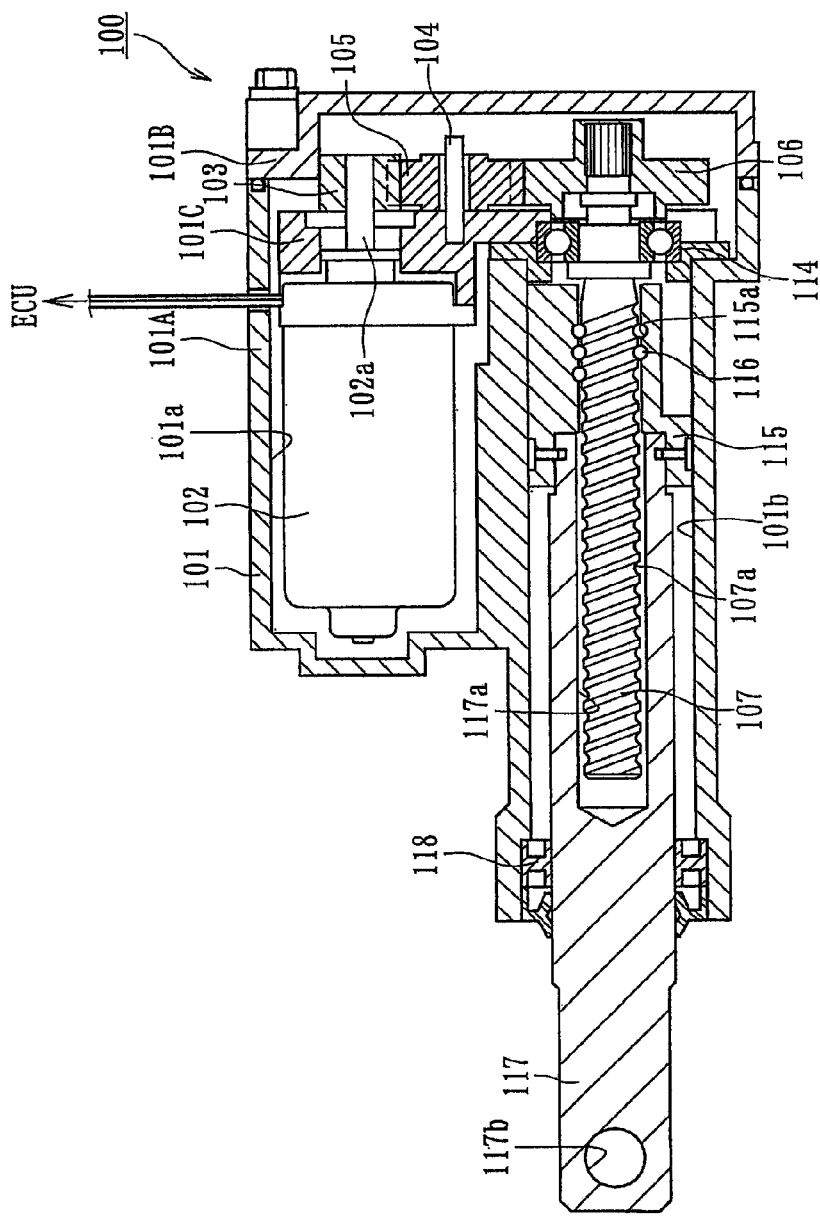
FIG. 5 is a longitudinal section view of a prior art electric actuator.
Figure 6:
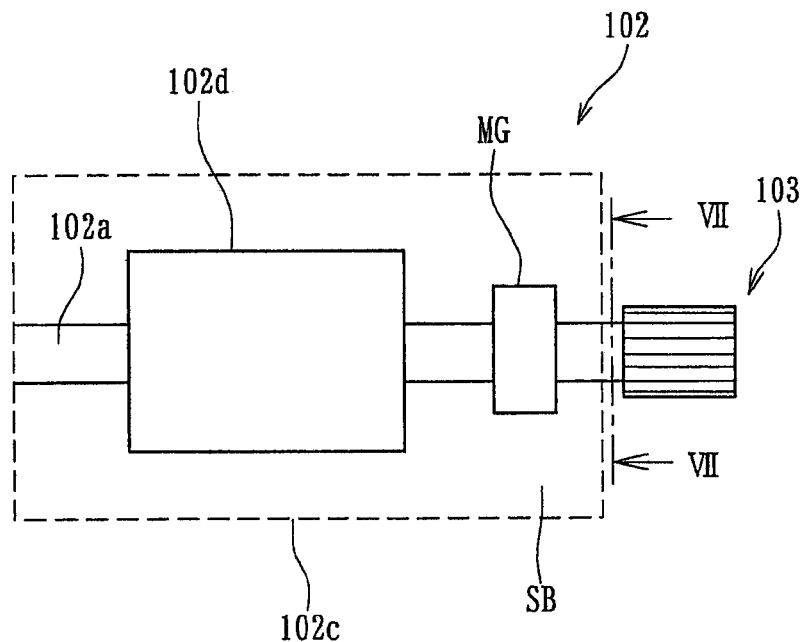
FIG. 6 is a schematic view of the electric actuator of FIG. 5.
Figure 7:
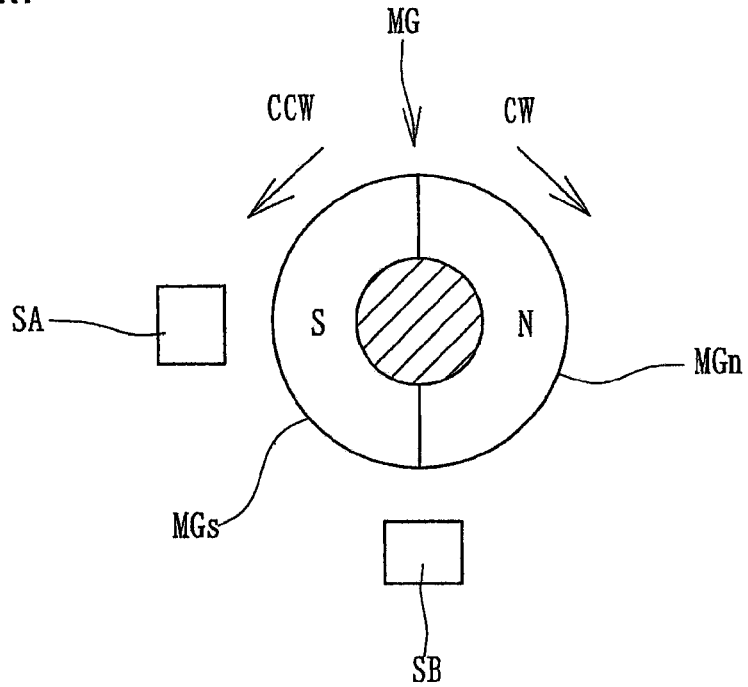
FIG. 7 is a cross-section view taken along line VII-VII of FIG. 6.

FIG. 1 is a longitudinal section view of a first embodiment of the electric actuator. FIG. 2 is a longitudinal section view of the ball screw mechanism of the electric actuator of FIG. 1. FIG. 3 is a cross-section view taken along line III-III in FIG. 1. FIG. 4 is a front elevation view of the sensor case of the electric actuator of FIG. 1.

The electric actuator 1 has a housing 2, an electric motor 3, a speed reduction mechanism 6, a ball screw mechanism 8, and a rotation sensor 9. The electric motor 3 is mounted on the housing 2. The speed reduction mechanism 6 includes a pair of spur gear 4, 5 to transmit the rotational power of the electric motor 3 to the ball screw mechanism 8. The ball screw mechanism 8 converts the rotational motion of the electric motor 3, transmitted via the speed reduction mechanism 6, to an axial linear motion of a driving shaft. The rotation sensor 9 (FIG. 3) detects the position of the driving shaft 7.

The housing 2 has a first housing 2a and a second housing 2b attached to the end of the first housing 2a. The electric motor 3 is arranged within the first housing 2a and secured on a disc-like motor bracket 10. The motor bracket 10 is mounted on the housing 2 so that it blocks the first and second housings 2a, 2b. An outer race of a ball bearing 11 is fit into the motor bracket 10. The ball bearing 11 rotationally supports a nut 24 of the ball screw mechanism 8.

A motor shaft 3a of the electric motor 3 projects from the bracket 10. The smaller spur gear 4 is mounted on the end of the motor shaft 3a and is incapable of relative rotation. The larger spur gear 5 is secured to the nut 24, forming the ball screw mechanism 8, and mates with the smaller spur gear 4.

The driving shaft 7 is contained in the second housing 2b. A swing link 14 is pivoted on a pin 12 secured to the driving shaft 7. The swing link 13 includes a first link member 14 and a second link 16. One end of the second link member 16 is connected to the first link member 14, via a pivot pin 15, to form a pendulum mechanism. The swing link 13 prevents rotation of the driving shaft 7 and enables the pendulum motion of the swing link 13 without the swing link 13 interfering with the axial motion of the driving shaft 7. Thus, it is possible to provide a compact electric actuator 1.

The other end of the second link 16 is connected to a pivotal shaft 17. The pivotal shaft 17 forms a reference point. A magnet 18 is mounted on the end of a pivotal shaft 17. A slide bush 19 and an oil seal 20 are mounted on the second housing 2b to slidably support the driving shaft 7 relative to the second housing 2b. The bush 19 and seal 20 prevent foreign matters, such as rain water or dust, from penetrating into the inside of the second housing 2b.

An opening 21 is formed in the second housing 2b. A sensor case 22 is mounted on the second housing 2b so that it blocks the opening 21. This makes the mount of the swing link 13 easy and the assembling operation simple. The sensor case is formed from materials that do not influence the detecting accuracy of the rotation sensor 9, e.g. thermoplastic synthetic resins such as PA (polyamide) 66 etc. or non-magnetic materials such as aluminum alloy, austenitic stainless steel (JIS SUS 304 group) etc. The sensor case is preferably formed by injection molding from thermoplastic resin. This enables a complicated configuration of the sensor case to be formed at a low manufacturing cost.

As shown in FIG. 2, the ball screw mechanism 8 includes a screw thread shaft 23, a nut 24 and a large number of balls 25. The screw thread shaft is formed with a helical thread groove 23a on its outer circumference. The nut 24 is formed with a helical thread groove 24a on its inner circumference opposing the helical thread groove 23a. The large number of balls 25 is rollably contained in a helical passage formed by the male and female thread grooves 23a, 24a. The larger spur gear 5 is press-fit onto the outer circumference of the nut 24. The ball bearing 11 is fit onto the first housing 2a. The motor bracket 10 is also fit onto the outer circumference of the nut 24 and is positioned by a stopper ring 26 so that it cannot move axially.

Referring again to FIG. 1, when the electric motor 3 is actuated, the driving power is transmitted to the nut 24 of the ball screw mechanism 8 via the reduction mechanism 6. Thus, the screw thread shaft 23 is linearly moved in its axial direction together with the driving shaft 7. Each of the link members 14, 16 swings in accordance with the linear motion of the driving shaft 7 and limits the range of the linear motion. During the linear motion, the pivotal shaft 17 is rotated within a predetermined range of the detection angle (i.e. swing angle). That is, it is possible to directly detect the position of the driving shaft 7 by measuring the detection angle with the rotation sensor 9. This will be described later in more detail at any position within the range of linear motion of the driving shaft 7.

As shown in FIG. 3 and FIG. 4, the rotation sensor 9 is arranged in the sensor case 22. The rotation sensor 9 is arranged in a keyhole-like recess 27 formed in the sensor case 22. The sensor case 22 is mounted on the second housing 2b by securing bolts 29. The pivotal shaft 17, on which the second link member 16 is fit, is rotationally supported on the second housing 2b via a needle roller bearing 28. The magnet 18 is secured on the tip end of the pivotal shaft 17. The rotation sensor 9 is arranged to oppose the magnet 18 via a predetermined air gap.

The keyhole-like recess 27 includes a circle-like portion 27a and a semicircle-like portion 27b. Each center of the magnet 18 and the rotation sensor 9 is arranged so that it corresponds to the center of the circle-like portion 27a of the keyhole-like recess 27. Electric harnesses 30, from a sensor substrate 9a for a power source and an output of the rotation sensor 9, extends from the circle-like portion 27a to a control apparatus (not shown) beyond the semicircle-like portion 27b. The voltage output from the rotation sensor 9 is obtained as both an analog signal and a digital signal since either the digital signal or the analog signal can be arbitrarily selected in accordance with the system. Although it is shown as a keyhole-like recess 27, any other configurations such as oval or rectangular configurations may be adopted if it is easy to set the central position of the rotation sensor 9.

As previously described, the rotation sensor 9 is arranged in the recess 27 and embedded therein by resin during molding. This makes it possible to shield the rotation sensor 9 and its associated parts from the external environment. Thus, this protects them and also provides an electric actuator 1, with the position detecting mechanism, with a low manufacturing cost and wide versatility. The recess 27 is formed without passing through the inner wall of the sensor case 22. Thus, it is possible to protect the rotation sensor 9 and its associated parts from the internal environment influences such as a splash of lubricating grease or penetration of any contamination. Although it is not illustrated, it may be possible to form a through aperture in the sensor case 22 and block it thereafter by any plate-like wall of non magnetic material, such as synthetic resin. This makes it easy to adjust the air gap adjustment between the rotation sensor 9 and the magnet 18.

As previously described, one end of the pivotal shaft 17 is supported by the bearing 28 mounted on the second housing 2b. The other end of the pivotal shaft 17 is contained and supported in a cylindrical bore 22a formed on the inner side of the sensor case 22. This makes it possible to guide the pivotal shaft 17 and thus to improve the assembling and workability as well as to stably support the pivotal shaft 17, by both the bore 22a and the bearing 28 at both its ends. In addition, it is possible to prevent attraction of iron powder in the contaminants to the magnet 18 by the bore 22a and thus improve the reliability of the actuator.

Although it may be possible to adopt a non-contact type Hall IC as the rotation sensor 9, according to the present disclosure, the rotation sensor 9 is formed by a semiconductor sensor with an integrated magnetic sensor and a signal processing circuit. Also, a function for detecting the absolute angle is incorporated. This makes it possible to keep the stable detecting accuracy for a long term and to improve the reliability even though vibration or shocks may be caused during severe running condition of the vehicle.

The electric actuator of the present disclosure can be applied to any electric actuator having a position detecting function and provided with a ball screw mechanism converting a rotation from an electric motor to a linear motion of a driving shaft, via the ball screw mechanism, used for a driving section of electric motors in general industries, automobiles, boats etc.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electric actuator comprising:
   a housing;
   an electric motor mounted on the housing;
   a speed reduction mechanism disposed in the housing for transmitting the rotational power of the electric motor to a ball screw mechanism; the ball screw mechanism being adapted to convert the rotational motion of the electric motor, transmitted via the speed reduction mechanism, to an axial linear motion of a driving shaft; and
   a rotation sensor mounted to the housing for detecting the position of the driving shaft;
   the ball screw mechanism comprises a screw thread shaft integrally formed with the driving shaft connected to the electric motor, the screw thread shaft is supported on the housing so that it can move axially but cannot rotate relative to the housing, a nut is inserted over the screw thread shaft, via a large number of balls, the nut is supported so that it can rotate relative to the housing, via a rolling bearing mounted on the housing, but cannot move axially;

a swing link, pivoted on a pin projecting from the driving shaft, is arranged to perform a pendulum motion interlocked with the linear motion of the driving shaft; and a magnet is mounted on an end of a pivotal shaft, the pivotal shaft mounted on the housing and forming the reference point of the pendulum motion and the position of the driving shaft is detected by the rotation sensor arranged opposite to the magnet via a predetermined air gap.

2. The electric actuator of claim 1, wherein a nonmagnetic material sensor case is mounted on the housing, the rotation sensor is arranged on the sensor case, and a detection angle of the swing link is measured via the sensor case.

3. The electric actuator of claim 1, wherein a through aperture is formed in a sensor case at a portion opposing the magnet and the sensor case is blocked by a plate-like wall of non-magnetic material, and the detection angle of the swing link is measured by the rotation sensor via the plate-like wall.

4. The electric actuator of claim 2, wherein an opening is formed in the housing and the sensor case is mounted on the housing so that it blocks the opening.

5. The electric actuator of claim 2, wherein one end of the pivotal shaft is supported by a bearing mounted on the housing and the other end of the pivotal shaft is contained and supported in a cylindrical bore formed on the inner side of the sensor case.

6. The electric actuator of claim 2, wherein a recess is formed in the sensor case and the rotation sensor is arranged in the recess and embedded therein by a resin molding.

7. The electric actuator of claim 1, wherein the rotation sensor is formed by a semiconductor sensor with an integrated magnetic sensor and a signal processing circuit and an incorporated function for detecting the absolute angle.

8. The electric actuator of claim 7, wherein the voltage output from the rotation sensor is obtained as both an analog signal and a digital signal.

9. The electric actuator of claim 1, wherein a sensor case is formed by injection molding of thermoplastic resin.

10. The electric actuator of claim 1, wherein the swing link comprises a first link member pivoted on the pin on the driving shaft and a second link member connected to the first link member via a pivot pin.

* * * * *

UNITED STATES PATENT AND TRADEMARK OFFICE
CERTIFICATE OF CORRECTION

| | | |
|---|---|---|
| PATENT NO. | : 8,650,977 B2 | Page 1 of 1 |
| APPLICATION NO. | : 13/478475 | |
| DATED | : February 18, 2014 | |
| INVENTOR(S) | : Takahashi et al. | |

It is certified that error appears in the above-identified patent and that said Letters Patent is hereby corrected as shown below:

In the Specification

<u>Column 5</u>
Line 43          after "line", insert --III-III--

Signed and Sealed this
Tenth Day of June, 2014

Michelle K. Lee
*Deputy Director of the United States Patent and Trademark Office*